(12) United States Patent
Gottumukkala et al.

(10) Patent No.: US 8,838,597 B1
(45) Date of Patent: Sep. 16, 2014

(54) SEMANTIC METADATA EXTRACTION

(75) Inventors: Raju Venkata Rama Raju Gopala Gottumukkala, Cumming, GA (US); Sreenivasa Rao Pragada, Irvington, NY (US); Abhijit Ashok Patil, Alpharetta, GA (US); Kaliki Murthy Aritakula, Cumming, GA (US); Viswanath Dasari, Alpharetta, GA (US)

(73) Assignee: Semantifi, Inc., Stamford, CT (US)

( * ) Notice: Subject to any disclaimer, the term of this patent is extended or adjusted under 35 U.S.C. 154(b) by 0 days.

(21) Appl. No.: 13/210,400

(22) Filed: Aug. 16, 2011

Related U.S. Application Data

(60) Provisional application No. 61/374,631, filed on Aug. 18, 2010.

(51) Int. Cl.
*G06F 17/30* (2006.01)

(52) U.S. Cl.
USPC .......................................... 707/736; 707/740

(58) Field of Classification Search
USPC .......................................... 707/736, 740, 803
See application file for complete search history.

(56) References Cited

U.S. PATENT DOCUMENTS

| | | | |
|---|---|---|---|
| 2004/0003132 A1* | 1/2004 | Stanley et al. | 709/316 |
| 2008/0104089 A1* | 5/2008 | Pragada et al. | 707/100 |
| 2008/0275866 A1* | 11/2008 | Pragada et al. | 707/5 |
| 2009/0063328 A1* | 3/2009 | Cuscovitch et al. | 705/38 |
| 2010/0293174 A1* | 11/2010 | Bennett et al. | 707/759 |

* cited by examiner

*Primary Examiner* — Monica Pyo
(74) *Attorney, Agent, or Firm* — Gordon Kessler

(57) ABSTRACT

A method and apparatus for extracting metadata. The method includes the steps of capturing metadata of one or more data sources, capturing metadata of one or more data sets comprising the one or more data sources, capturing metadata of one or more fields comprising one or more of the data sets, and capturing metadata of content within zero or more of the fields. The extracted metadata is stored to a non-volatile computer readable storage medium.

19 Claims, 11 Drawing Sheets

| Dataset | |
|---|---|
| ID | INT |
| NAME | STRING |
| TYPE | ENUM |
| LOOKUP_VALUE_COLUMN | STRING |
| LOOKUP_DESCRIPTION_COLUMN | STRING |
| LOWER_LIMIT_COLUMN | STRING |
| UPPER_LIMIT_COLUMN | STRING |
| PARENT_TABLE | STRING |
| PARENT_TABLE_COLUMN | STRING |

| Data Entity Driver | |
|---|---|
| ID | INT |
| DATASET_COLLECTION_ID | INT |
| DATASET_ID | INT |
| DATA_ENTITY_ID | INT |
| ENTITY_MEMBER_ID | INT |
| ENTITY_TYPE | ENUM |

| Data Entity | |
|---|---|
| ID | INT |
| NAME | STRING |
| DATA_TYPE | ENUM |
| SEMANTIFY_TYPE | ENUM |
| UNIT | ENUM |
| FORMAT | STRING |

| Dataset Collection | |
|---|---|
| ID | INT |
| SOURCE_ID | INT |
| NAME | STRING |
| DESCRIPTION | STRING |
| STATUS | ENUM |
| TYPE | ENUM |
| SUB_TYPE | ENUM |

| Entity Member | |
|---|---|
| ID | INT |
| VALUE | STRING |
| DESCRIPTION | STRING |
| LOWER_LIMIT | STRING |
| UPPER_LIMIT | STRING |

| Source | |
|---|---|
| ID | INT |
| NAME | STRING |
| TYPE | ENUM |
| CONENCTION_PROPERTIES ... | |

FIGURE 3

| Reverse Index of Data Entity Driver | |
|---|---|
| ID | INT |
| NAME | STRING |
| DATASET_COLLECTION_NAME | STRING |
| DATASET_NAME | STRING |
| DATA_ENTITY_NAME | STRING |
| ENTITY_MEMBER_VALUE | STRING |
| ENTITY_TYPE | ENUM |
| DATASET_COLLECTION_DRIVER_ID | INT |
| DATASET_DRIVER_ID | INT |
| DATA_ENTITY_DRIVER_ID | INT |
| ENTITY_MEMBER_DRIVER_ID | INT |

FIGURE 4

| Joins | |
|---|---|
| ID | INT |
| DATASET_COLLECTION_ID | INT |
| SOURCE_TABLE_NAME | STRING |
| DESTINATION_TABLE_NAME | STRING |
| JOIN_ORDER | INT |
| JOIN_LENGTH | INT |

| Joins - Joins Definition | |
|---|---|
| JOINS_ID | INT |
| JOINS_DEFINITION_ID | INT |

| Joins Definition | |
|---|---|
| ID | INT |
| DATASET_COLLECTION_ID | INT |
| SOURCE_TABLE_NAME | STRING |
| DESTINATION_TABLE_NAME | STRING |
| SOURCE_COLUMN_NAME | STRING |
| DESTINATION_COLUMN_NAME | STRING |
| TYPE | ENUM |

FIGURE 5

SEMANTIC METADATA EXTRACTION

CROSS REFERENCE TO RELATED APPLICATIONS

This application claims the benefit of U.S. Provisional Patent Application Ser. No. 61/374,631 titled "Metadata Extraction of Structured Content", filed Aug. 18, 2010 to Gottumkkala et al., the entire contents thereof being incorporated herein by reference.

FIELD OF THE INVENTION

Embodiments of this invention relates generally to metadata extraction and more particularly to a method and apparatus for extracting metadata and more particularly to a method and apparatus for extracting metadata from any type of structured content, storing the extracted metadata in a common metadata repository, and federating queries to find data sources that can answer the queries in accordance with the captured metadata rather than by querying the data sources on demand.

BACKGROUND OF THE INVENTION

Metadata in general be may defined as 'data that provides information about one or more other aspects of data. These other aspects may comprise anything, such as an indication of the type or nature of the data, purpose of the data, time and date of creation, creator or author of data, placement/location on a network where the data was created/persisted/available or any other information that provides more detail to and about the actual data. Data may be stored in a number of different formats: structured flat files such as Comma, tab, etc. delimited, XML files, Data Cubes or Summary/Aggregated Datasets, Sampled Datasets, or Relational Databases, etc. searching.

If all data sources followed a standardized data structure and metadata definitions they can be seamlessly searched. Since standardizing data structures of different data sources is not practical, this application proposes a method of standardizing the metadata of any structured data source and storing into a common metadata repository and finally federating user query via this repository to data sources that can answers the query based on the level of match.

Therefore, it would be desirable to provide a method and apparatus that overcomes these noted drawbacks of the prior art and allows for extraction of additional useful metadata from databases and datasets, and also provide rich metadata from file based datasets.

SUMMARY OF THE INVENTION

Therefore, in accordance with one or more embodiments of the present invention, an inventive semantic metadata extraction process is provided to capture metadata from any structured data source such as a database or structured file based datasets and store this captured metadata in a standardized metadata repository and finally employ this repository to identify one or more data sources that are able to answer a query, as determined in accordance with the stored metadata. The inventors of the present invention have recognized that the data structure of any structures data source can be fully described in up to four levels of metadata, information about the data source, information about one or more data sets within the data source, information about one or more fields of the data sets, and information about one or more content within the fields.

Consider a structured flat file such as a comma delimited (CSV) file. Such a file may include some file related information such name, author, date of creation, etc. Then inside the file, the inventors have determined there are fields in columns and values in rows or vice versa. Such a file may have up to four levels of metadata that may be classified in accordance with one or more embodiments of the invention: info on the data source/file, information about any individual files within (in this case there are no individual files within the data sources, alternately, the data source itself is the only file), information about the fields, and optionally capture values inside select fields whose values may be searched upon. Alternatively, consider a data source that is stored as a relational database. In such a file, it may be possible to capture as many as four levels of metadata: information about the data source/database, information about any individual files within (in this case the various tables inside the database), information about the fields, and optionally values inside select fields whose values could be searched upon. Of course in accordance with the invention, this metadata may be divided into any desired number of groupings or categories. Such division in contemplated in accordance with the invention, in that these categories will include the describe metadata.

Rather than requiring conversion of data and metadata, a conceptual standardization is provided in which data and metadata is determined for each data type, including data source information, data file information, data field information, and data member information. Information about the data source may include information indicating a set of flat files, databases, vendor of data type, type of SQL, etc., lookup tables, thus indicating a collection of one or more types of data files. Information about one or more individual data files of a particular data source type may comprise whether the file is a table, lookup table, flat file, XML file, etc. for each individual data file for each of the possible data source types. Data field information inside the data files may comprise information about type of columns, data types of the columns, such as are the columns identifications, metric measurements, dates, database keys, etc. Information inside such a column may comprise particular identifications, such as product names, query indexed information, such as for example country names, state names and other lookup fields containing information that may be desired to be searched upon, or that have content that may be of interest to one or more users.

In accordance with one or more embodiments of the present invention, a metadata repository is therefore provided including the four levels of information noted above to allow a determination to be made of whether a particular data source is able to answer a question, and not necessarily to actually answer the question. In this manner, the metadata may be employed to determine likelihood of a response to a query, which data sources may be best to answer a query, and a number of data sources that may be necessary to search to give a confidence level that an adequate response may be provided. Therefore, in accordance with various embodiments of the present invention, metadata may be converted or captured from any structured database or data set, irrespective of structure, source, vendor, operating system, etc. into a standard conceptual metadata construct, involving the four key entities noted above to provide seamless query access to any number or type of structured data sources.

In accordance with various embodiments of the invention, the definition of metadata is preferably extended to a next level to capture business and other important information along with data level information as part of the four key entities noted above. A process may also be provided to capture the entire spectrum of metadata in a simple and intuitive manner. Such metadata may be extracted and stored in an indexed manner targeted for applications which require easy access to business level metadata information, dynamic query generation and optimization, semantic search engines etc.

Furthermore, as noted above, while almost all existing database engines allow for the capture of metadata at primitive level and generally store this metadata in the form of data dictionaries, storage and access may still not uniform across various database engine vendors. Thus, in accordance with various embodiments of the present invention, extracted metadata may be stored in an indexed manner in accordance with the four key attributed described above, and be easily accessed and use by various other applications which may make use of such extracted metadata information. Such applications may include applications that rely on business level metadata information, applications performing dynamic query generation and optimization, and various semantic search engines etc. and the like.

Therefore, in accordance with one or more embodiments of the present invention user query may be federated across any number of data sources which have been processed according to the present invention to find one or more data sources that are able to answer the user query without having to query the actual data sources. Therefore, while a determination of which data sources may answer a query may be quickly provided, without the need to provide apriori hard wiring of all data connections.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 3 depicts a sample metadata storage structure, and in particular a data entity driver, in accordance with an embodiment of the invention;

FIG. 4 depicts a sample metadata storage structure, and in particular a data entity reverse index, in accordance with an embodiment of the invention;

FIG. 5 depicts a sample metadata storage structure, and in particular a data entity relations, in accordance with an embodiment of the invention.

DETAILED DESCRIPTION OF THE PREFERRED EMBODIMENTS

Various embodiments of the present invention will now be described, making reference to the figures in which like reference numbers depict like structure. In accordance with one or more embodiments of the present invention, a unique method for richer metadata extraction from a variety of data sources, preferably via an intuitive and user friendly web interface, is presented. The inventive metadata extraction process is devised to work with a large variety of datasets from any number of data sources. Datasets may be originated from delimited or fixed-length files such as CSV, TSV or any other delimited files, or in the form of single or multiple sheet work books such as Excel or any other variety of relational database. The inventive metadata extraction process may extract metadata from all these different kind of datasets and databases from virtually any provider. The inventive extraction process may comprise the combination of data analysis for metadata extraction, persistence and advanced indexing of the extracted metadata.

Extracted and indexed metadata may be cleanly organized in accordance with the four key attributes noted above, and may further facilitate other metadata driven automated analytical applications to provide much richer and targeted results to their consumers or other users. The inventive metadata extraction process, through its unique and sophisticated methodology, may facilitate generation of rich metadata out of delimited or other files which otherwise carry very poor metadata within them.

Figure 1:
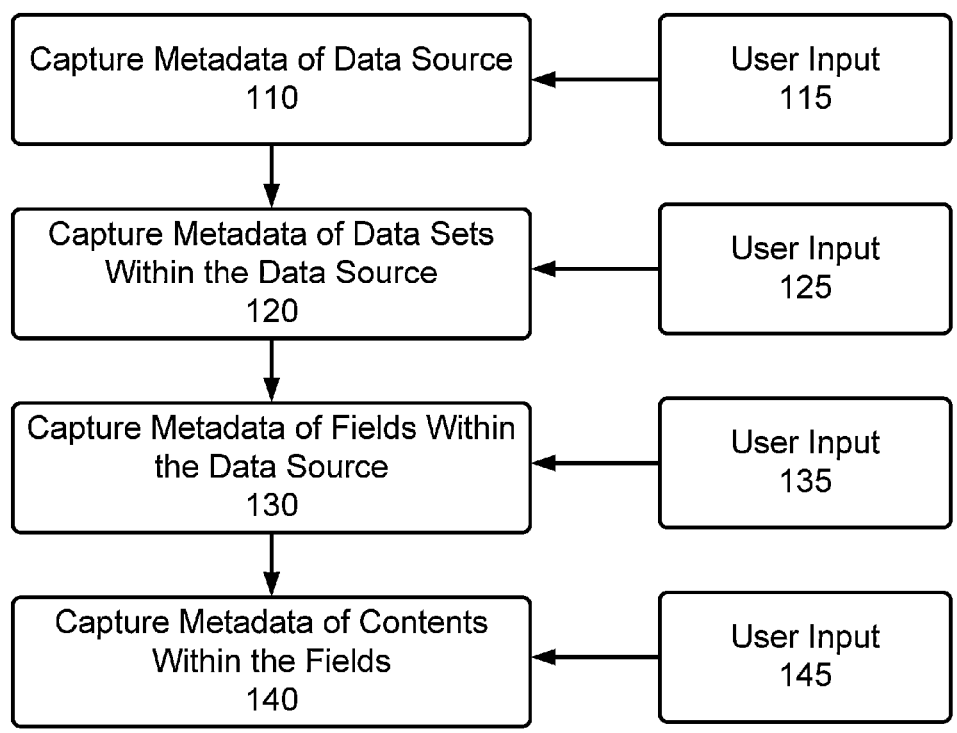
FIG. 1 is a flowchart diagram depicting acquisition and extraction of various levels of metadata in accordance with various embodiments of the invention.

In accordance with embodiments of the invention, metadata is preferably captured as associated with four main components and steps corresponding to the four key attributes noted above, although one or more or such steps may be omitted as suggested by the data or any data access request. As is shown in FIG. 1, these four main components comprise 1) capturing metadata of a data source; 2) capturing metadata of datasets within the data source; 3) capturing metadata of fields within the dataset; and 4) capturing metadata of contents inside fields wherever applicable. Each of these component steps will now be described in greater detail.

Capturing metadata of data source, shown at step 110 of FIG. 1, preferably includes capturing metadata such as name of the data source, various information about the data in the data source, a location of the data source, information related to the creation and/or modification of the data, maintenance information such as a frequency of the data update or data refresh etc. As this information may not be contained within the data source, user input 115 preferably provides any additional needed metadata information. Thus, data source information may be captured in accordance with a combination of extracted data source information and user input.

Next, at step 120, metadata of datasets within the data source may be captured. Such metadata preferably includes information related to the type of the dataset categorical or facts based, name of the dataset, relationship(s) with other datasets in the data source etc. The type or nature of the dataset may be identified by the fields, or conceptually columns, in the dataset, and may refer to whether the fields are primarily categorical or whether the fields of the dataset containing mostly measures. If it is determined that the dataset includes only categorical fields based then it may be termed as a lookup based dataset. If it is instead determined that the dataset does not include only categorical fields, but also includes "measures" fields, then the dataset may be labeled as a facts based dataset. Relationships may be identified by analyzing the constraints defined on this dataset in conjunction with other datasets within the data source. Relationships may be captured in terms of the fields in the dataset. As this information may not be contained within the data source, user input 125 preferably provides any additional needed metadata information. Thus, as this second level of abstraction, types of files from one or more data sources are described, and relationships between them may also be determined.

Processing then continues with step 130, where metadata of fields within the dataset are captured. Such metadata information may include the name of the field, basic data type of the field, a unit of data type of the field, such as currency, distance etc, significance of this field in the containing dataset, nature of the data contained in this field etc. If the data source is a database, some of this information may be available from the database. If a file based dataset is accessed, this information is not typically available. Thus, in accordance with the invention, this metadata is preferably generated and extracted in accordance with various embodiments of the invention. As this information may not be contained within the data source, user input 135 preferably provides any additional needed metadata information. Thus, in accordance with the invention, the same level of rich metadata information may be captured, even from file based datasets.

In order to extract this richer metadata information from file based datasets, a number of different data tests may be performed. Thus, in case of such file based data sources, determination of a basic data type may be evaluated by number of heuristics. Thus, if it is determined that the data resembles a "date" format then the data may be captured and labeled as a date. Alternatively, if it is determined that the data meets the requirements of a real number, then the data may be captured and stored as a number etc. Additionally, a unit type of such field data type may also be extracted by analysis. Many time field names or the field name in conjunction with the dataset name provides some information about the unit of the data that may be included in the data fields, such as currency, distance, height etc.

Additional metadata to be extracted may include a data type evaluation. Evaluation of data type for a particular data field within a data set in accordance with various embodiments of the invention may include a series of steps to confine the possible data type starting from very high level data type to a specific level data type and validating each of the data type over a sampled data out of the source. In a particular example, a first base assumption may be that the data type is a string. Processing may then be provided that evaluates the data to determine whether any additional structure may be present in the data. Thus, in accordance with this particular embodiment of the invention, the data may first be analyzed to determine whether the data comprises real numbers with decimals, and if so to label the data in the data field as a real number. If not, then the data may be analyzed to determine whether the data comprises a natural number without decimals. If it is determined that the data is not stored in either of these formats, the data may be further analyzed to determine whether the data contains dates and/or times. Such date/time types may be evaluated using any number of preconfigured date formats, which may be preferably ordered from most commonly used to most rarely used formats. This date time evaluation may preferably be performed over a sample data and if a particular format is identified, this format may then be validated against the whole data field.

Once categorized, fields determined to include particular types of data may then be further analyzed to extract additional information that may be useful to a user. For example, a field that is identified as being formatter to hold real numbers may be further evaluated for to determine a type of business level or other data that may be included in the field, including currency, distance, height etc and the like, utilizing the earlier captured contextual information related to that field. String based fields may also be additionally evaluated to contain information such as email addresses, web links, web addresses, location information etc. This kind of rich information is not available through conventional metadata extraction processes.

Referring back to FIG. 1, processing may continue at step 140, where metadata about the nature of the data contained in the fields may be extracted, this metadata generally not being available in general metadata repositories. Thus, in accordance with various embodiments of the invention, the first metadata that may be extracted comprises an entity type. Various entity types that may be captured in accordance with the invention may comprise a Simple Lookup, Range lookup, Hierarchical Lookup, Measure etc. Additional entity types may be included as desired. Once determined, as will be described below, the data in these fields may be used to answer certain types of questions or provide certain categories of data that may not have been previously possible. One or more of the following content definitions may be determined to exist in data contained within a particular field.

Simple Lookups—Simple lookups may provide information such as Product Id and Product Name, Department Id and Department Name etc. These types provide information to answer questions such as "Sales of product type Cash Card", "number of employees in labor department" etc Range Lookups—A band of values or a range of numbers defined over a simple lookup or a measure may be treated as range lookups. Examples may comprise Fico Score ranges less than 500 as "Low", from 500 to 690 as "Medium" and greater than 690 as "High". These lookups facilitates answering questions such as "Sales of customers with low fico score" and federating the queries such as "number of employees with salary between 20000 and 50000" to a data cube (database) containing the matching range defined for salary of range value from 20000 to 50000 etc.

Hierarchical Lookups—Number of companies belonging to a sector, number of sub-categories belongs to a category are examples of hierarchical lookups. These lookups enable presentation of dynamic results of drill down nature Measures—Data variables that are varying over a period or over a location may be considered measures. Sales and Interest when varying over transactional month are examples of such measures. These are fields from which statistics such as average, summation and variance etc can be calculated. These not typically grouping fields When capturing metadata of contents inside the fields where ever applicable, including simple lookups, range lookups and hierarchical values, categorical information such as value and description are preferably extracted. In case of range lookups, range information such as lower bound and upper bound are also preferably captured. For hierarchical values, parent value and parent description at each field value level may be captured. These captured values then may be used to determine various answers to one or more questions that may be posed.

Figure 2:
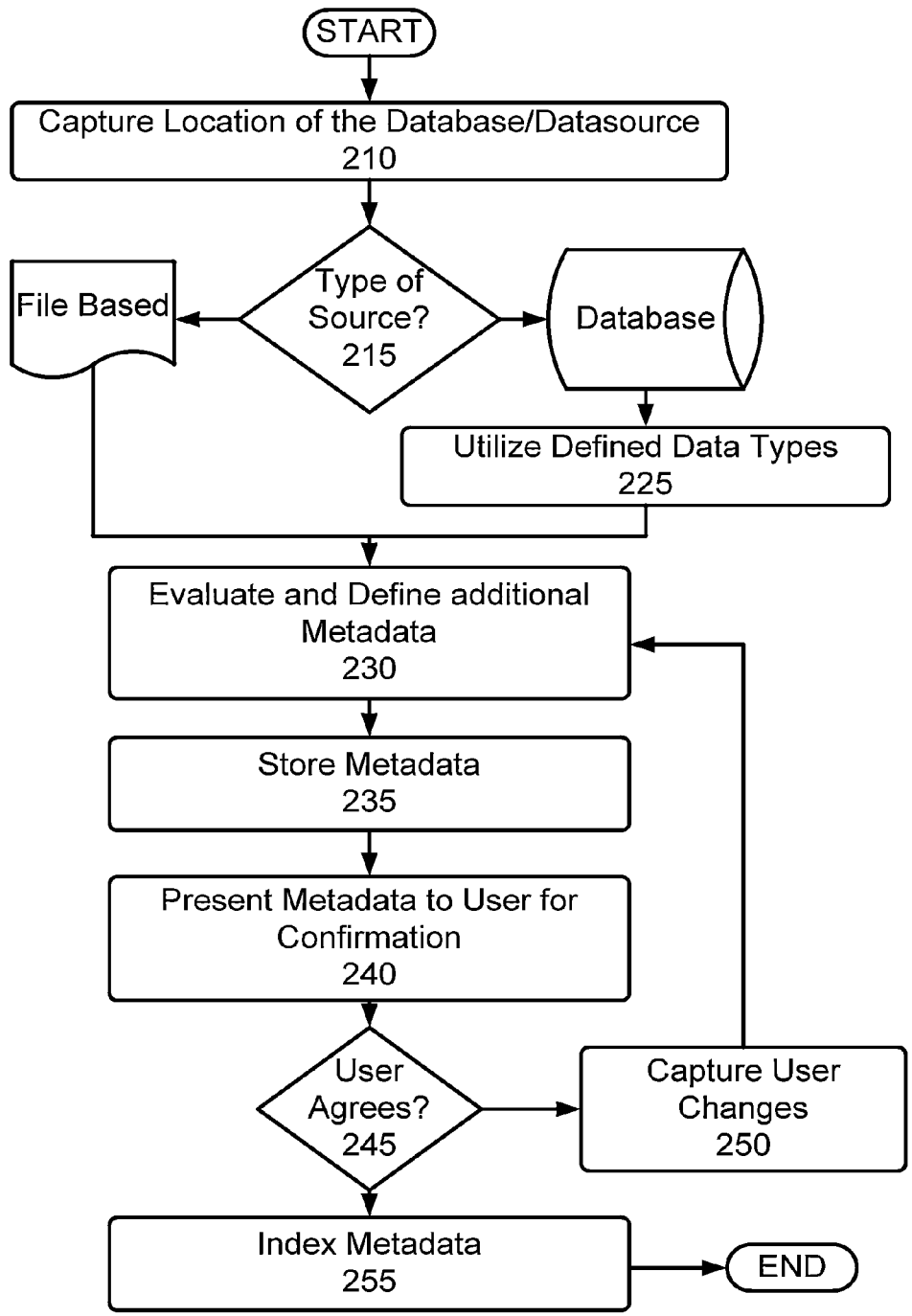
FIG. 2 is flowchart diagram indication a process for extended metadata extraction in accordance with an embodiment of the invention.

Referring next to FIG. 2, a more detailed process for performing metadata extraction in accordance with the invention is shown.

A metadata extraction process in accordance with embodiments of the present invention broadly comprises the steps of capturing information from the dataset owner/provider via an intuitive web interface, capturing information from the dataset via dataset analysis confirmed by user, capturing relations relating entities in the dataset, determining constraints and joining scenarios by analysis the dataset along with already captured prior to this step, and finally indexing the captured metadata in order to facilitate the use thereof.

As is shown in FIG. 2, first a location of the database is captured at step 210. This location is captured so that the database may be further accessed in the future as necessary. Then at step 215, a type of data source is determined. If it is determined at step 215 that the data source is a database, various defined data types may be extracted at step 225, while if it is determined that the source is a file based data set, no such defined data types may be available. Processing then passes to step 230 where various additional metadata information may be extracted from either type of data source, proceeding in accordance with steps described above in FIG. 1. Thus, corresponding to steps 110 and 115 of FIG. 1, metadata of a data source is first captured, and allows for user input to classify and add additional information as appropriate.

Figure 7:
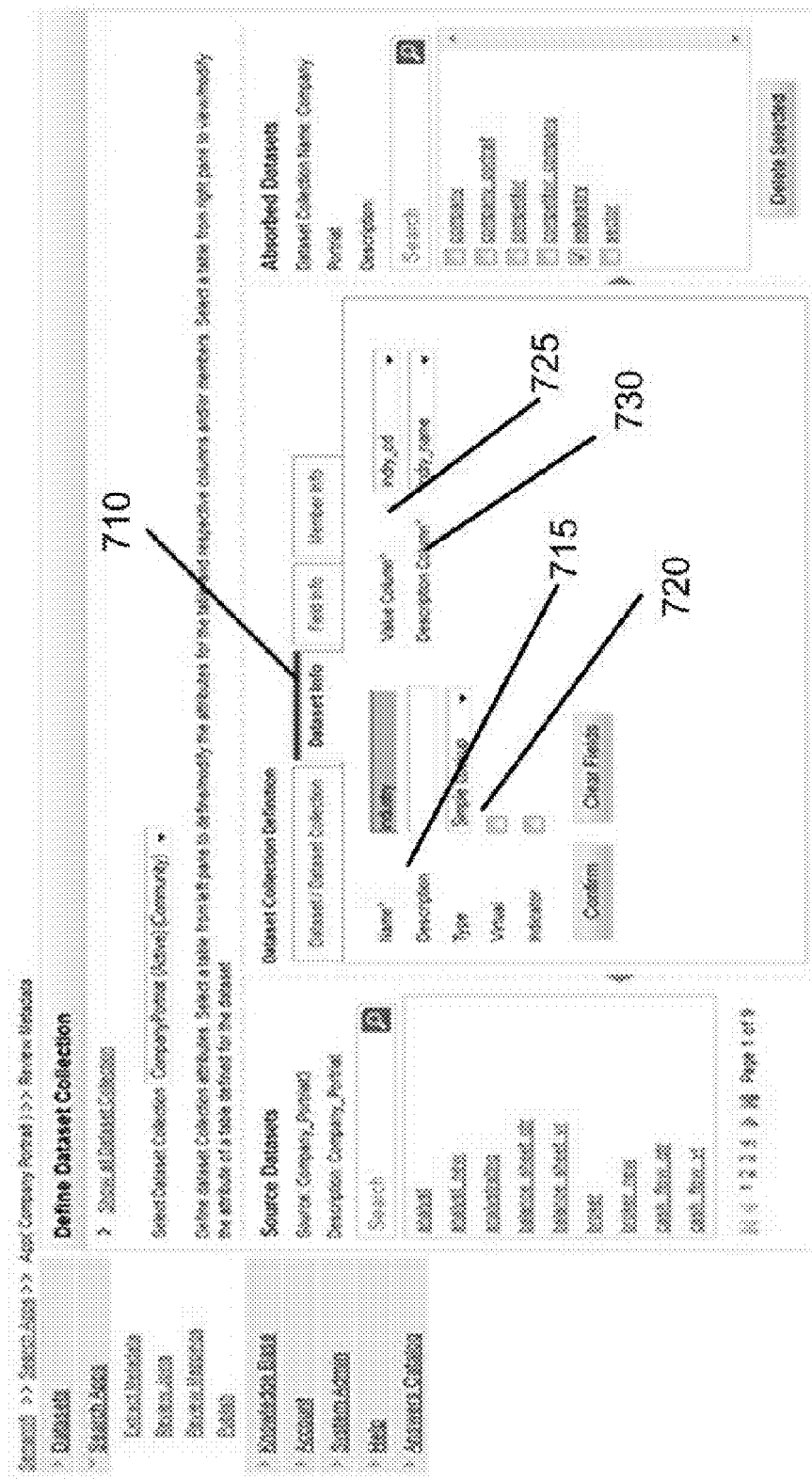
FIG. 7 is a screen shot representation of data presented to a user to confirm dataset information in accordance with an embodiment of the invention.

Next, corresponding to step 120 and 125 of FIG. 1, metadata of the data sets within the data source is determined. As is shown in FIG. 7, after identification of a particular data source the user is asked to provide or confirm dataset information 710, comprising various data set names 715, types 720, values in a column 725 and description of a column 730. Other various information may be provided, and this information may be provided or multiple columns, etc. in the database, as can be seen by the various selection boxes associated with the above-noted information. Information such as the type of the dataset, source of the dataset, name of the dataset, business vertical that the dataset is categorized into etc. may be received from a user via a web interface or other appropriate input mechanism. It may be necessary to obtain this information directly from the user as this information may not be stored as standard metadata, and cannot be extracted from the data content. The dataset and received information may then be transferred (in case of a file based dataset) and staged to a central storage location, or a connection is established to the dataset (in case of a relational schema).

Figure 8:
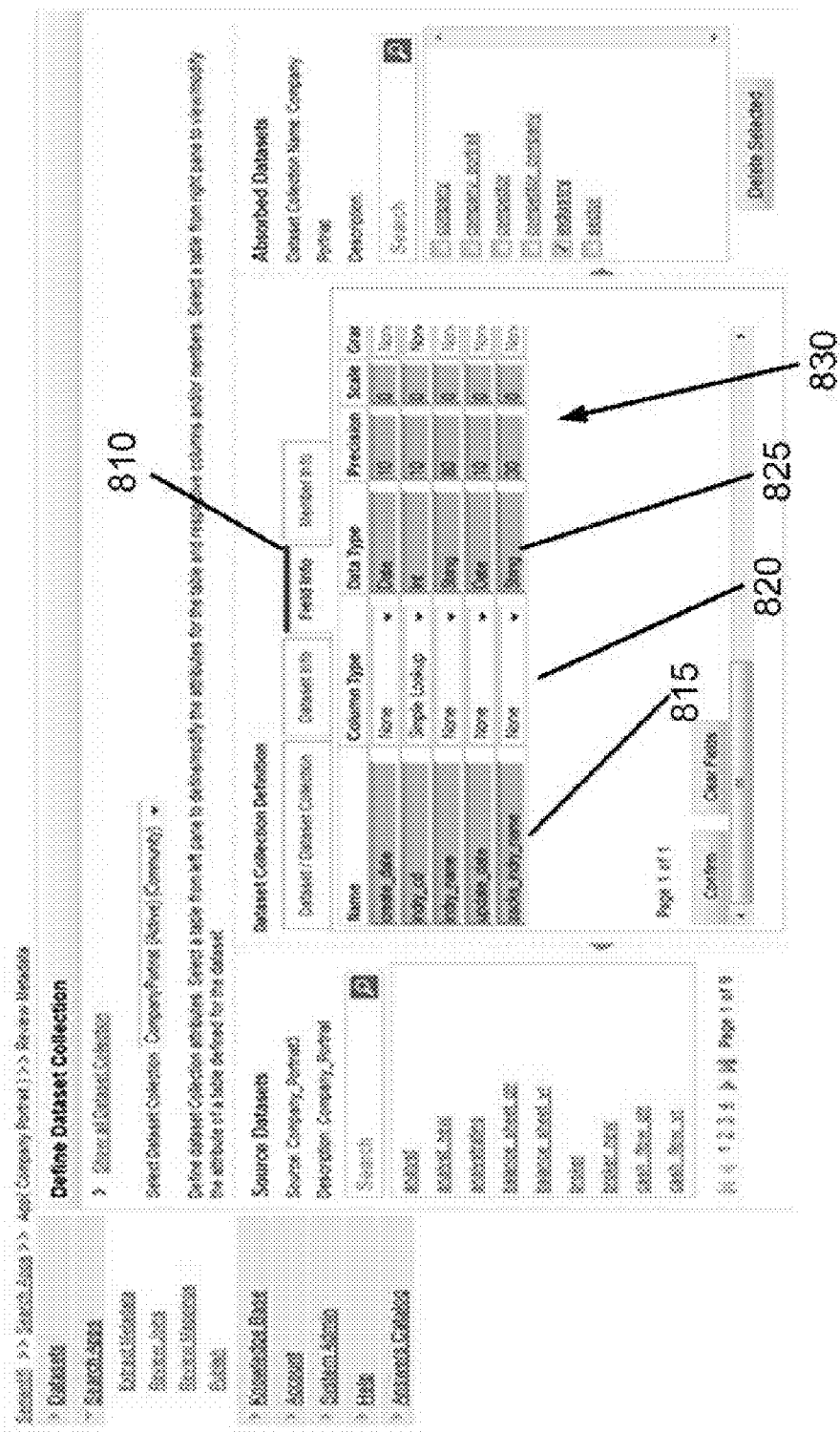
FIG. 8 is a screen shot representation of data presented to a user to confirm field information in accordance with an embodiment of the invention.

Next, corresponding to steps 130 and 135 of FIG. 1, metadata of the fields within the data source is captures. As is shown in FIG. 8, field information 810 preferably comprises field name information 815, column type information 820, comprising a type of information contained in the column, a data type 825, comprising the attributes of the data within the field, and various other information 830 dependent on the data type to define one or more additional attributes thereof. Data types of the dataset data entities may be evaluated through a number of steps. In case of relational schema, data types are taken as is from the database metadata dictionaries and only the nature of the data entity is evaluated. In order to evaluate the true possible data type from file based dataset, in accordance with embodiments of the invention, the staged data is preferably analyzed, looking for whether a data entity could be Date/Time based, could be a decimal number or just an integer or it is a general text. The inventive process also evaluates to see what exact representation a date based data entity is, like is it a Month level or a Year level etc. For evaluating a data entity towards date, the system may use well known date format representations and validates them on each and every possible data entity.

After performing of such an analysis, all of the determined data types and the like may be presented to the user for confirmation. In one embodiment of the invention, as is further shown in FIG. 1, only user confirmed data type information is captured as part of the metadata to avoid possible corruption in the data. In alternative embodiments of the invention, such confirmation may not be necessary.

After data type evaluation and confirmation, the inventive system may analyze the nature of the data entities to check against whether a data entity is representing a lookup, is representing a measure (i.e. a continuously varying data field), or is a frequency based data entity where such a frequency entity is defined as a data entity on which the data varies within the dataset. All this analysis about the nature of the data entities may also be presented to the user for confirmation, once confirmed may be absorbed into the metadata. Of course, such confirmation may be skipped.

Thus, in accordance with various embodiments of the invention, various of this information may be provided as determined by the system of the invention, or may be provided or updated by the user.

Figure 9:
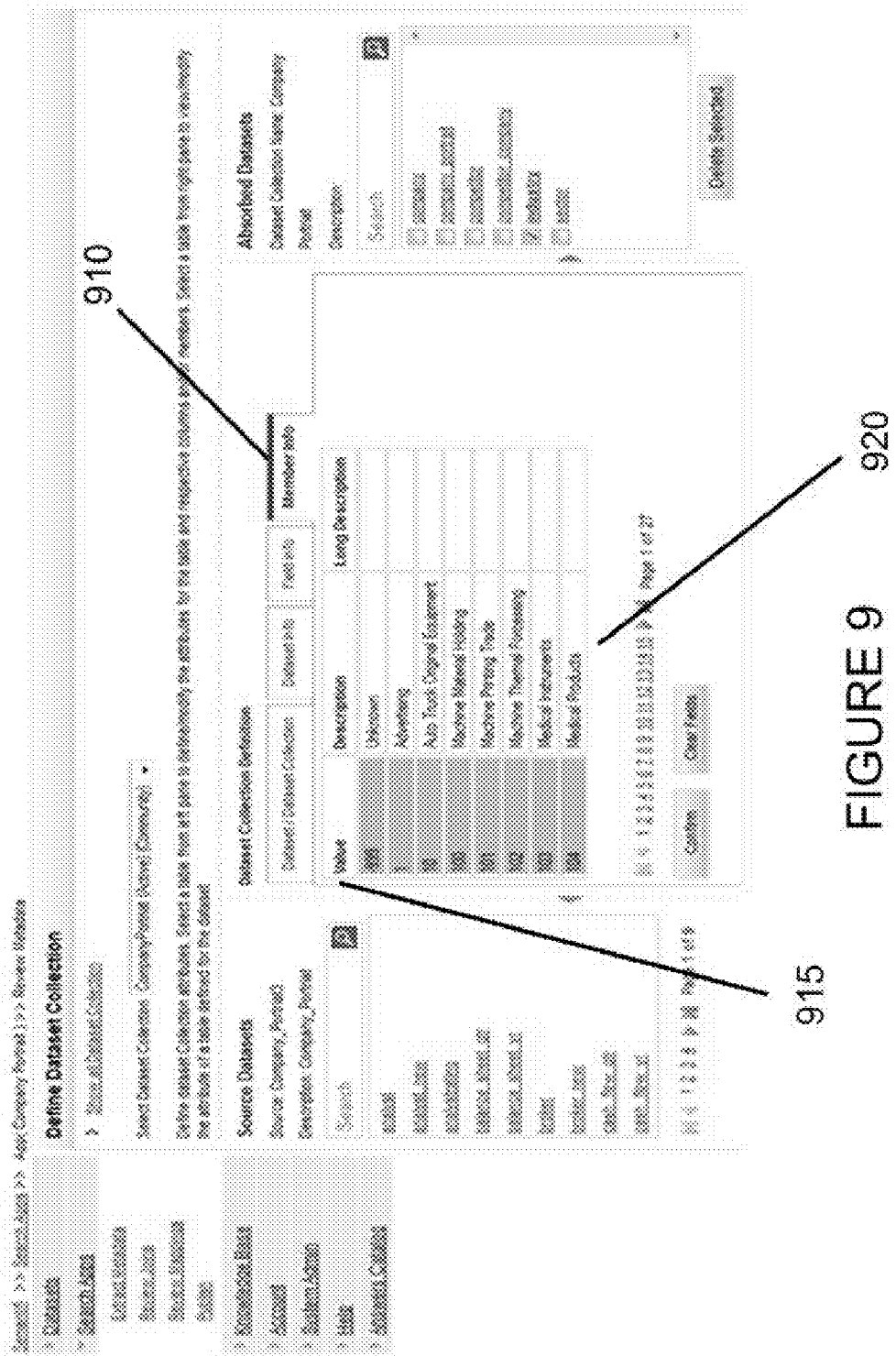
FIG. 9 is a screen shot representation of data presented to a user to confirm member information in accordance with an embodiment of the invention.
Figure 10:
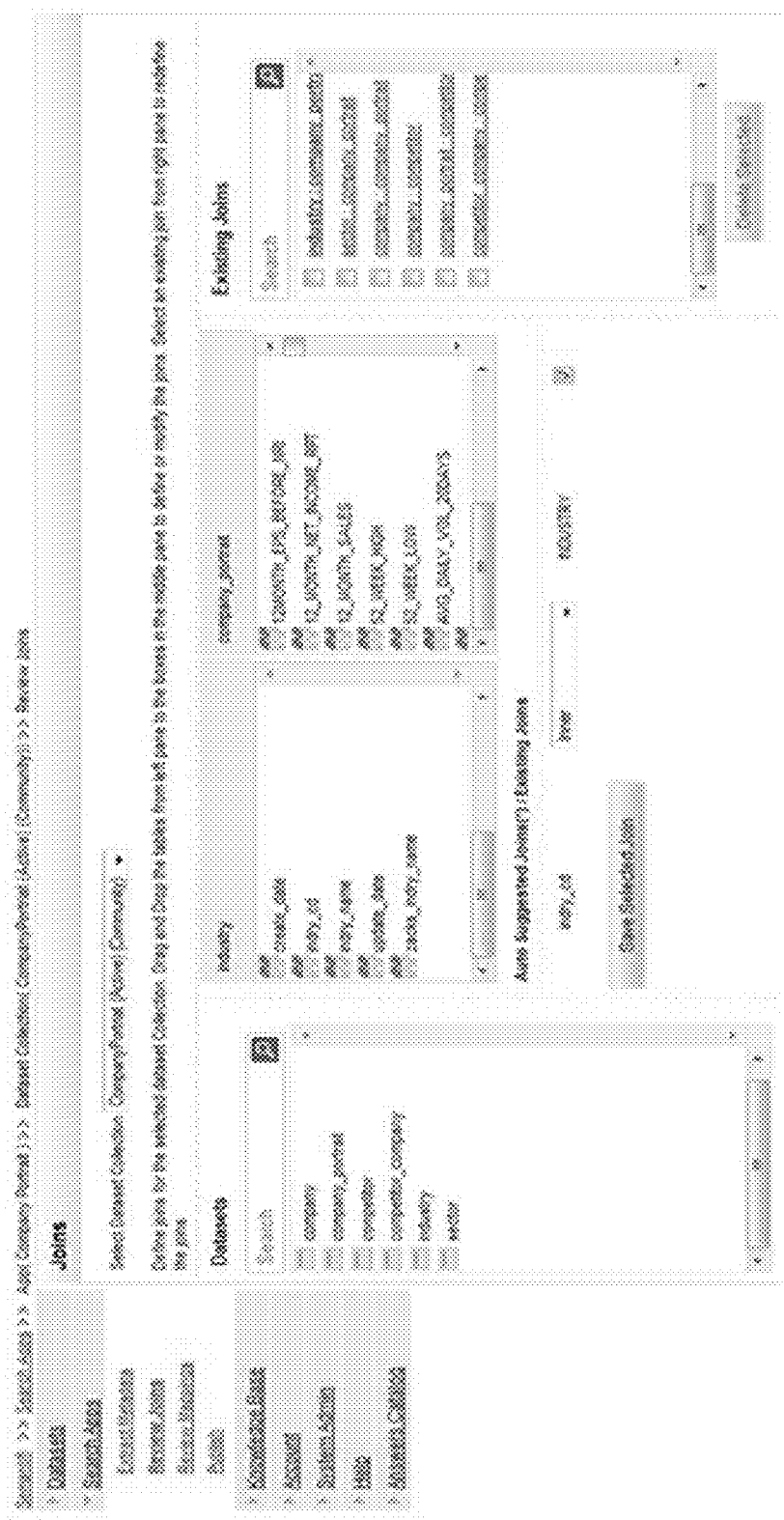
FIG. 10 is a screen shot representation of data presented to a user to confirm relationships across one or more datasets in accordance with an embodiment of the invention.

Next, corresponding to steps 140 and 145 of FIG. 1, metadata associated with contents within one or more fields is collected. As is shown in FIG. 9, a situation in which a column includes codes corresponding to various descriptions is shown. Thus, for each field, a group of member information 910 may be defined, including one or more member possible values 815, and corresponding descriptions 820. Thus, for each field, all possible values may be defined, depending of the type of field. In this lookup type of field, it is contemplated that all possible member values for a field are predetermined. Finally, as is shown in FIG. 10, one or more relationships across one or more datasets may be defined. In this manner, not only is the metadata for a particular dataset catalogued, but information indicating how one or more datasets may interact may also be determined or defined.

After such metadata related to the four key attributes is extracted in accordance with various embodiments of the present invention, the metadata is stored at 235, and presented to a user, or otherwise automatically or manually checked, to confirm accuracy at step 240. If the user or other checking system requires changes to the metadata, such changes are processed at step 250. Processing then returns to step 230 to determine whether such user changes require any additional changes in the evaluation and definition of other or the metadata. If at step 245 the user does not require any changes to the metadata, processing passes to step 255 where the metadata is indexed for easy searching, and then processing ends.

Once all of the metadata information has been determined, it is preferably stored in a number of related tables, as shown in FIG. 3. Thus, as is shown in FIG. 3, information related to the dataset is stored in the dataset table, information about data entities corresponding to the dataset are stored in the data entity table, and information about member of the data entity are stored in the entity member table. Furthermore, further information related to the interrelationship between the dataset to other datasets is stored in the data entity driver table, and other information related to the dataset collection and source information for the dataset are also stored in respective metadata tables. FIG. 4 then shows a reverse index of the entity driver information, making finding of such information easier for a search query, in order to be able to easily retrieve the required entities by name, by type, by relation, and also by a combination of entity definitions. FIG. 5 further shows additional information for a data entity joining a particular dataset. After the data entity nature is captured, the inventive system may attempt to capture any relations between various data entities in the dataset. If any relations are present, the system may capture them and also may attempt to capture the joining conditions that are determined to be feasible based on the relations. The inventive system may also attempt to capture the constraints defined on data entities and all the constraints presented are used to enhance the joining conditions.

The inventive system may also utilize string proximity as one of the ways to figure our possible relations between the data entities apart from the relations defined at dataset metadata dictionary level. These analysis steps preferably ease the metadata definition for the user as most of the metadata is suggested by the system and allows the user to amend/correct it.

In accordance with embodiments of the invention, it is contemplated that an additional metadata repository may also be provided. Such an additional metadata repository referencing the same dataset may preferably be generated in accordance with the above metadata extraction process, but may comprise a business model representation, and may be termed as KDX (knowledge Data Index). KDX is again a metadata repository which is complemented by SDX, but representing the dataset as a business model, and specifically referring to the capture of information related to a particular business, which can directly used by one or more semantic search applications to understand a user's questions asked in English or other conventional language utilizing the language and/or business semantics.

Enhancements Over Conventional Metadata Extraction and Storage Processes

The inventive semantic metadata extraction process does not stop at extracting the entities as with more traditional metadata extraction techniques. Rather, it preferably extracts relationships between entities, constraints defined over entities, business nature of the entities such as Lookup/Measure/Id etc.

Conventional metadata extraction processes do not address the extraction of metadata from file based datasets. The inventive metadata extraction process, however, may extract the same level of richness in metadata as compared to that available when the metadata is stored in a relational database schema, even from text based files such as delimited files along with semi-structured files such as spreadsheets.

The inventive metadata extraction process may capture various relations & constraints between various portions of the data, and may utilize them in defining the possible joining scenarios between various entities and therefore present them in an easy to extract manner (reverse indexes). This provides easy to use extracted metadata data to any application built to optimize and validate information retrieval based upon queries that may be dynamically generated out of a business scenario.

Any kind of metadata information may be captured in accordance with the inventive method from any kind of data source, whether that data source is file based or based upon a relational schema. If the data presented in accordance with the invention is extremely rich in nature, a business model may be extracted.

Conventional metadata extraction processes extracts only the data type of entities as available at the source, where in accordance with embodiments of the present invention, metadata is enriched to present a more true/close representation by applying a sampled data analysis for data types. The same mechanism may be used to extract the business nature of the entities.

APPLICATIONS

Various applications are possible using metadata extracted in accordance with the invention.

Dynamic query generation from a business scenario is feasible where join identification, join optimization, and invalid query identification are easily developed. Metadata extracted by this application's process also facilitates easy federation of the queries across various available data sources.

Automated extraction of metadata and building knowledge model of structured content, (representation of the business model in ontological constructs) development is feasible for any given dataset in an automated and/or semi-automated machine based process as explained below.

Figure 6:
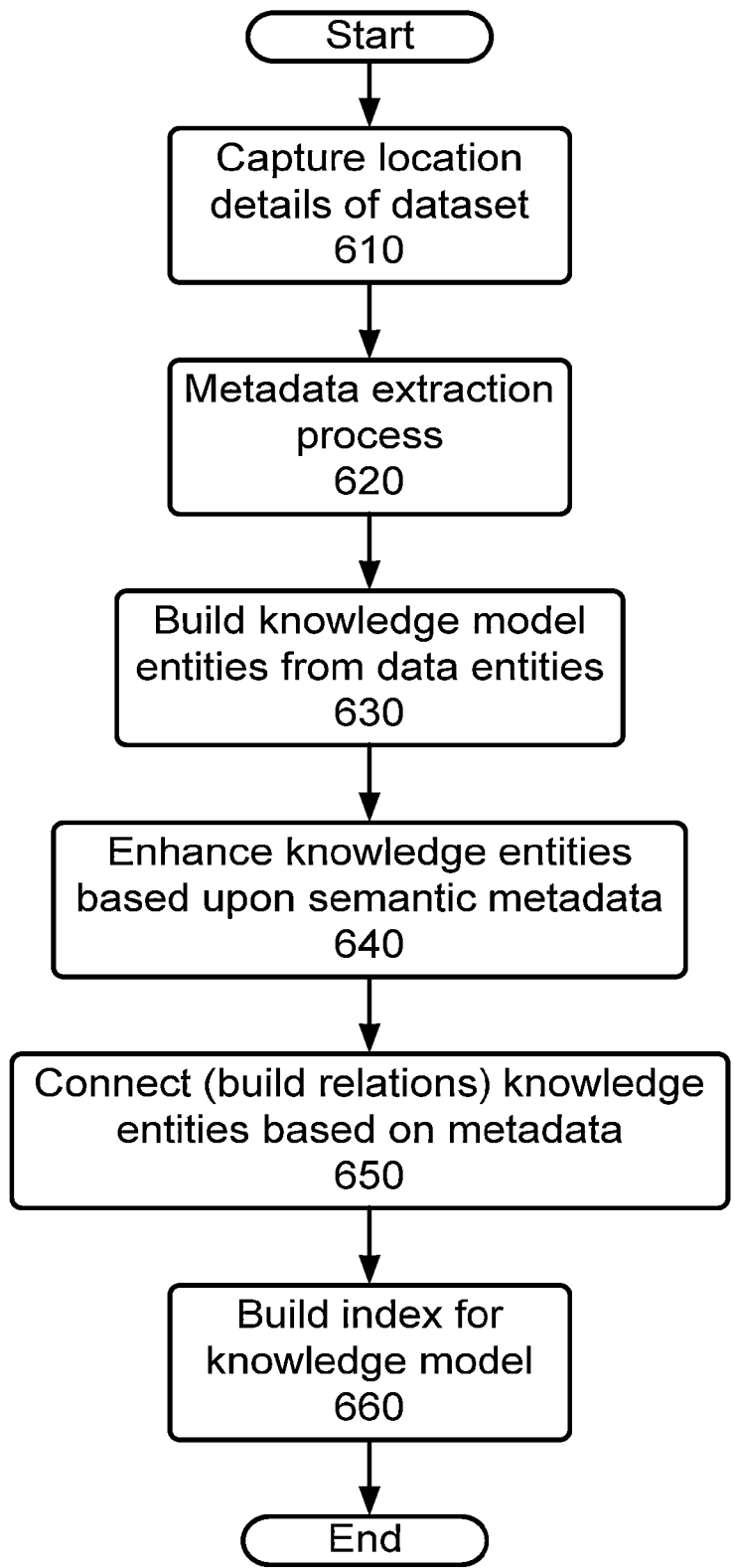
FIG. 6 depicts an example of overall use of metadata that may be extracted in accordance with an embodiment of the invention.

Building a knowledge base from any given dataset/data source is a very complex and laborious task and automating the process is the best solution to capture very high number of datasets as their business model representations and then to knowledge bases so that semantics based search applications can leverage the information captured to provide best search results on top of datasets. Therefore, as is shown in FIG. 6, an overall implementation of building a knowledgebase in accordance with various embodiments of the present invention is shown. First at step 610, location details about the dataset are captured. Then the metadata extraction process as described above may be employed at step 620. One or more knowledge model entities may be built from the extracted metadata at step 630. At step 640, the knowledge entities may be enhanced based upon any additional extracted metadata, and at step 650, relations between the knowledge entities may be defined. Finally, at step 660 an index, or reverse index may be generated based upon the knowledge model. It is this reverse index that may be used to compare to one or more user queries to determine one or more data sets that may be able to provide information about the user query, and thus avoiding actually querying the data information to make such a determination.

This process is an intuitive and easily manageable and configurable way to capture the information from any given dataset/data source and extract the metadata and then to transform that information into a rich business model representation. Finally this process indexes the information in order for the search applications to directly utilize this information without any further enhancements.

Needed user interaction in this process is very minimal and is confined to providing the source of the dataset and confirming the understanding of the data. Though the details/information captured by machine is and can be overridden by user any time but not mandated by the process. Overriding the machine understanding is provided just as a plug-in to the machine process if in case user wanted to enhance the business model beyond machine understanding and is always optional to the user.

Capture the source of the dataset and provide as the input to the application of "Metadata Extraction of Structured Data". The output of the process is semantic metadata extracted for the dataset in consideration (SDX).

From the realized SDX entities which are also called as data entities, knowledgebase entities which are also called as business entities are created. This is performed as a true mapping between data entities and knowledge entities. String beautification is performed to make the knowledge entities names better readable.

Based on the business metadata at SDX, knowledge entities behavior is defined. At this point of process, knowledge entities represent true nature captured at their corresponding data entities.

Relations captured at SDX as joins and constraints are used to build relationships among the business entities. This information constitutes to the business model of the source data. In order to complete the knowledge base representation of the dataset, various indexes are created out of captured metadata and finally those are arranged in a reverse index fashion to allow them to be searched most effectively. Metadata for variables that are measurable may include one or more of name, column type, data type, precision, scale, granularity, conversion type, format, unit, and default metrics. Metadata for variable which are dimensional may include one or more of ID, short description, long description, and member information.

In accordance with an embodiment of the invention, a Dataset Federation is an application that helps to identify which of the datasets could possibly answer a particular business query and order and/or filter them based on the most suitable and/or quickest among the datasets over a list of datasets. The process for identification of datasets that may answer a business query under consideration is performed in accordance with a mapping retrieval process. Ordering and/or filtering of one or more datasets is performed via a sequence of steps in which each dataset's relevance towards the business in consideration is determined through a process of incrementing or decrementing a relevance value in accordance with one or more determinations about the dataset. In the entire process of federation, decisions are based on a cumulative relevance weight of the dataset representation as related to a business query under consideration.

Mapping retrieval of federation may also be referred to as light or primary federation. In accordance with an embodiment of the invention, meta-data of one or more business entities and data entities are mapped via their meta-data representation identities, in order to represent either of the models. One business entity may be mapped to one or more data entities and similarly one data entity may be mapped to one or more business entities. In accordance with the invention, in order to improve and speed the process for performing such matching, mapping is stored in one direction only, that is business entities to data entities, though the data may be read in the reverse order as well.

Each business entity mapping may be marked as a primary mapping, based on whether this mapping is the one which provides a primary level of information link between the meta-data of both the worlds (KDX and SDX, or business information and stored content data). All other mappings from the same business entity to other stored content data will be marked as non-primary so as to not be considered in the described federation process. Non-primary mappings are need in the system for various other aspects and may be ignored with respect to the federation process, although it may be possible to use these other non-primary mappings.

During a mapping retrieval process, all primary mappings of the one or more ontological business entities participating in the business query under consideration are determined. Each ontological business entity from the business query carries a weight (preferably as a decimal number or fraction, but any weighting system may be employed) in accordance with its representation of a segment of the query. Entities from a visual representational segment (for example SELECT clause of in SQL query) carry weight different than the entities from a conditional segment.

Based on the cumulative weight of entities from each of the dataset representations of the same business query, datasets with respect to the business query are ordered. This ordered set of dataset representations is then provided as an input to a process for ordering or filtering of datasets that comprises part of the federation process, as will now be further described, making reference to FIG. 11.

Figure 11:
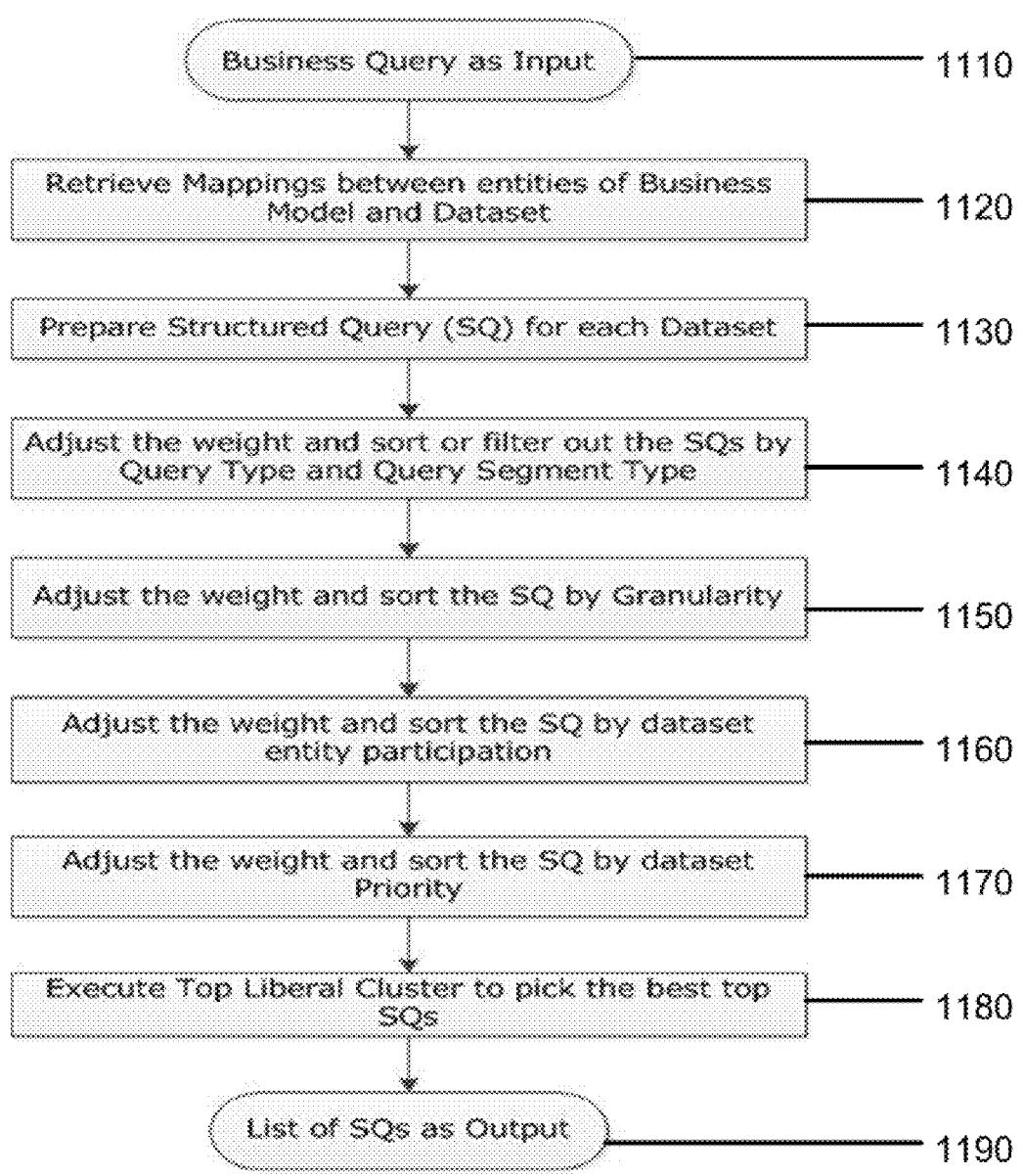
FIG. 11 is a flowchart diagram depicting federation of queries in accordance with an embodiment of the invention.

A process for filtering or ordering of one or more datasets that may be responsive to particular query in a business or other context may also be employed in the federation process, and which may also be termed heavy or deep federation. As is shown in FIG. 11, at step 1110, an input for this process is received, and preferably comprises an outcome of the mapping retrieval process described above. This input may include one or more datasets ordered in accordance with their relationship to the business query currently under consideration. At step 1120, mappings between entities making up the business model and the dataset are retrieved, and at step 1130, a structured query is prepared for each dataset.

Heavy or deeper federation employs a sequence steps which utilizes heavy analysis and deeply examines a query representation of each of the datasets under consideration towards the business model represented by the business query in consideration. In accordance with an embodiment of the invention, one or more heuristics may be defined in order to filter or evaluate the dataset against a business query. Some of these heuristics may be applied in accordance with this embodiment as set forth below.

At step 1140, the weight of one or more datasets representative of its ability to properly respond to, and answer a particular business query may be adjusted, and one or more datasets may be sorted or filtered out based upon query type and query segment type. After analysis of the business query, it may be determined that some of the types of datasets cannot answer the question and/or cannot answer the question completely. So in these cases either the dataset may be filtered or its weight may be reduced in accordance with the severity of the missing portion of the query segment requested. For example, if a limiting condition is present in the business query, datasets comprising the type Data-mart and Cube cannot answer the question correctly. So these datasets will be filtered out of the possible responses, or their weight will be reduced. Similarly, if a cohort is present in the business query, then Cube and Marts datasets may be filtered out.

Next, at step 1150, one or more of the datasets responsive to the structured query may again have their relevance weight adjusted in accordance with the granularity thereof. By looking at the data entities present in a query representation of the dataset, if appropriate granularity is already present, then weight may be increased for that dataset, otherwise the weight may be decreased. After processing for all the datasets, datasets may ordered by weight.

At step 1160, the relevance weight of the one or more datasets may be further adjusted in accordance with dataset entity participation. Apart from the data entities, in conditions related to dimension based entities, values associated with one or more of the particular dimensions may also affect the relevance of the dataset in relation to the business query. If the value of a condition which is based on a dimension entity in the structured query is not present for the dataset then the condition itself may not be valid for the dataset. In such cases, condition may be removed from that dataset perspective and weight of the dataset be reduced.

At step 1170, the relevance weight of a particular dataset may be adjusted based upon priority associated with the dataset. Such priority of a dataset may be based upon the dataset's ability to respond quickly to a particular business query, and also by its nature (Warehouse, Transaction System, Cube and Mart). In this step priority of the dataset may be considered in ordering of the datasets that could answer the business query. Thus, if two datasets, such as datasets of type warehouse and cube, are of equal weight with respect to a particular business query then because the dataset of type cube is the fastest to answer, so the warehouse type dataset may be filtered out, or have its relevance weight reduced.

Then, at step 1180 the one or more datasets are ordered and filtered by their relevance weights with respect to the business query under consideration using a top liberal clustering algorithm. To deter mine a best group of potential datasets for responding to the business query, and at step 1190, the list of the datasets associated with the one or more structured queries are provided. This final outcome of the federation will be preferably passed on to the next portion of the system, query generation, as described above.

Therefore, in accordance with one or more embodiments of the invention, metadata can be effectively extracted from one or more datasets, and may be used to aid in determining one or more datasets that may be appropriate for answering a user query without the need of actually querying each of the complete datasets.

The invention may be preferably implemented on a multi-purpose general computer system, having local or remote (i.e. cloud) storage, processing or the like, and may be presented to one or more users over a local network, or over the world wide web or other widely available network. The computer system may be provided with one or more components to implement the various embodiments of the invention, including processors, storage, communication devices, input and output apparatuses, displays and the like. The system may further include one or more mobile components, allowing for access or processing in accordance with one or more well known mobile communication protocols.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for extracting metadata, and for determining one or more data sources that is able to provide an answer to a query, comprising the steps of:
   capturing metadata of one or more data sources at least in part in accordance with information provided by a user;
   capturing metadata of one or more data sets comprising the one or more data sources at least in part in accordance with information provided by the user;
   capturing metadata of one or more fields comprising one or more of the data sets at least in part in accordance with information provided by the user;
   capturing metadata of content within zero or more of the fields in accordance with an analysis of data contained therein; and
   storing the captured metadata to a non-volatile computer readable storage medium;
   receiving a query having one or more query elements;
   accessing a metadata index formed by categorizing the captured metadata into one or more groups, and indexing the metadata;
   matching one or more of the query elements to one or more metadata elements in the one or more groups of the metadata index;
   returning one or more data sources able to answer the query;
   calculating a ranking of the returned one or more data sources corresponding to the ability of each data source to answer the query in accordance with a level of match between the query and the metadata index elements associated with the particular data source;
   adjusting a ranking of one or more of the returned one or more datasets in accordance with one or more determined missing portions thereof relative to a business category of the query; and
   returning one or more data sources having the highest ranking.

2. The method of claim 1, wherein the metadata is extracted from any structured data.

3. The method of claim 2, wherein the structured data is a database.

4. The method of claim 3, wherein at least a portion of the metadata of the data source, metadata of the one or more data sets, metadata of the one or more fields, and metadata of one or more content is included with the database.

5. The method of claim 2, wherein the structured data is a file based data set.

6. The method of claim 5, wherein the file based data set is selected from the group of csv, xml, excel, and streaming data feeds.

7. The method of claim 1, further comprising the step of defining one or more relationships between one or more of the data sources in accordance with the extracted metadata.

8. The method of claim 1, further comprising the step of building a knowledge model in accordance with the extracted metadata.

9. The method of claim 8, further comprising the step of indexing the knowledge model.

10. A method for extracting metadata, and for determining one or more data sources that is able to provide an answer to a query, comprising the steps of:
    capturing a location of one or more data sources;
    determining a type of each of the one or more data sources;
    generating metadata for each of the one or more data sources in accordance with an analysis of one or more data elements included within the one or more data sources;
    storing the metadata to a non-volatile, computer readable storage medium;
    indexing the metadata;
    receiving a query having one or more query elements;
    accessing the metadata index formed by determining metadata elements for each of the one or more data sources, categorizing the generated metadata into one or more groups, and indexing the metadata;
    matching one or more of the query elements to one or more metadata elements in the one or more groups of the metadata index;
    returning one or more data sources able to answer the query;
    calculating a ranking of the returned one or more data sources corresponding to the ability of each data source to answer the query in accordance with a level of match between the query and the metadata index elements associated with the particular data source;

adjusting a ranking of one or more of the returned one or more datasets in accordance with one or more determined missing portions thereof relative to a business category of the query; and returning one or more data sources having the highest ranking.

11. The method of claim 10, wherein the step of determining metadata for each of the one or more data sources further comprises the steps of:

capturing metadata of the one or more data sources;

capturing metadata of one or more data sets comprising the data sources;

capturing metadata of one or more fields comprising one or more of the data sets; and capturing metadata of content within one or more of the fields.

12. The method of claim 10, further comprising the steps of:

presenting to a user the determined metadata;

receiving from the user confirmation of the determined metadata; and receiving from the user additional metadata information.

13. A method for determining one or more data sources that is able to provide an answer to a query, comprising the steps of:

receiving a query having one or more query elements;

accessing a metadata index formed by generating metadata elements for each of the one or more data sources in accordance with at least one of information provided by a user related to one or more data elements of the one or more data sources and information extracted based upon the contents of one or more elements of one or more of the one or more data sources, categorizing the generated metadata into one or more groups, and indexing the metadata;

matching one or more of the query elements to one or more metadata elements in the one or more groups of the metadata index;

returning one or more data sources able to answer the query;

calculating a ranking of the returned one or more data sources corresponding to the ability of each data source to answer the query in accordance with a level of match between the query and the metadata index elements associated with the particular data source;

adjusting a ranking of one or more of the returned one or more datasets in accordance with one or more determined missing portions thereof relative to a business category of the query; and returning one or more data sources having the highest ranking.

14. The method of claim 13, wherein the determining the one or more data sources that is able to provide an answer to the query is performed without querying the actual data sources.

15. The method of claim 13, wherein the addition of one or more additional data sources results in consistent performance of determining with of the one or more data sources can answer the query.

16. A non-transitory computer readable storage medium storing a computer program, the computer program causing a multi-purpose computer to perform the steps of:

capturing metadata of one or more data sources at least in part in accordance with information provided by a user;

capturing metadata of one or more data sets comprising the one or more data sources at least in part in accordance with information provided by the user;

capturing metadata of one or more fields comprising one or more of the data sets at least in part in accordance with information provided by the user;

capturing metadata of content within zero or more of the fields in accordance with an analysis of data contained therein;

storing the captured metadata to a non-volatile computer readable storage medium;

receiving a query having one or more query elements;

accessing a metadata index formed by categorizing the extracted metadata into one or more groups, and indexing the metadata;

matching one or more of the query elements to one or more metadata elements in the one or more groups of the metadata index;

returning one or more data sources able to answer the query;

calculating a ranking of the returned one or more data sources corresponding to the ability of each data source to answer the query in accordance with a level of match between the query and the metadata index elements associated with the particular data source;

adjusting a ranking of one or more of the returned one or more datasets in accordance with one or more determined missing portions thereof relative to a business category of the query; and returning one or more data sources having the highest ranking.

17. The non-transitory computer readable storage medium of claim 16, the computer program further causing the multi-purpose computer to perform the step of building a knowledge model in accordance with the extracted metadata.

18. The non-transitory computer readable storage medium of claim 17, the computer program further causing the multi-purpose computer to perform the step of indexing the knowledge model.

19. A system for capturing metadata of one or more data sources, and for determining one or more data sources that is able to provide an answer to a query; comprising:

an input apparatus for receiving information about one or more datasets in accordance with at least information provided by a user;

a processor for capturing metadata of one or more data sets comprising the one or more data sources in accordance with at least information provided by the user, for capturing metadata of one or more fields comprising one or more of the data sets in accordance with at least information provided by the user, and for capturing metadata of content within zero or more of the fields; and a non-volatile computer readable storage medium for storing the extracted metadata;

wherein the processor further receives a query having one or more query elements, accesses a metadata index formed by categorizing the captured metadata into one or more groups, indexes the metadata, matches one or more of the query elements to one or more metadata elements in the one or more groups of the metadata index, returns one or more data sources able to answer the query, calculates a ranking of the returned one or more data sources corresponding to the ability of each data source to answer the query in accordance with a level of match between the query and the metadata index elements associated with the particular data source, adjusts a ranking of one or more of the returned one or more datasets in accordance with one or more determined missing portions thereof relative to a business category of the query, and returns one or more data sources having the highest ranking.

\* \* \* \* \*